United States Patent [19]

Molyneux

[11] 4,136,496
[45] Jan. 30, 1979

[54] STRUCTURAL ELEMENTS FOR SUB-FRAMES

[75] Inventor: George Molyneux, Plymouth, England

[73] Assignee: Radway Plastics Limited, England

[21] Appl. No.: 879,567

[22] Filed: Feb. 21, 1978

[30] Foreign Application Priority Data

Jan. 28, 1978 [GB] United Kingdom ............... 3582/78

[51] Int. Cl.² ......................... E06B 3/04; F16B 11/00
[52] U.S. Cl. ...................................... 52/302; 52/656; 403/401; 403/403
[58] Field of Search ................. 52/302, 209, 656–658, 52/475; 403/401–403

[56] References Cited

U.S. PATENT DOCUMENTS

| | | | |
|---|---|---|---|
| 3,211,481 | 10/1965 | Cadovius | 403/403 X |
| 3,716,259 | 2/1973 | Weill | 52/302 X |
| 3,725,995 | 4/1973 | Sharp et al. | 52/656 X |
| 3,726,551 | 4/1973 | Levenberg | 52/656 X |
| 3,845,599 | 11/1974 | Jolly | 52/302 X |
| 3,958,889 | 5/1976 | Berkowitz | 52/656 X |

FOREIGN PATENT DOCUMENTS

| | | | |
|---|---|---|---|
| 636973 | 12/1963 | Belgium | 403/402 |
| 1804759 | 5/1969 | Fed. Rep. of Germany | 403/401 |
| 2135749 | 1/1972 | Fed. Rep. of Germany | 403/401 |
| 2204646 | 8/1973 | Fed. Rep. of Germany | 403/401 |
| 1042736 | 9/1966 | United Kingdom | 403/401 |

Primary Examiner—J. Karl Bell
Attorney, Agent, or Firm—John C. Smith, Jr.

[57] ABSTRACT

The invention provides a structural assembly for use in a building comprising a pair of strip elements which form adjacent horizontal and vertical sides of a frame and a corner piece joining said two strip elements together, said corner piece comprising a hollow body, formations at right angles to each other on said hollow body providing respective spigot-and-socket connections with said two strip elements, said body of said corner piece having a moisture retaining wall arranged so that moisture draining from one of said strip elements into said corner piece, on that side of said moisture retaining wall which includes the spigot-and-socket connection for the strip element which provides said vertical side of said frame, is contained therein by said wall.

In the preferred construction, said moisture retaining wall comprises an internal web substantially dividing one part of the interior of said corner piece from another part.

10 Claims, 4 Drawing Figures

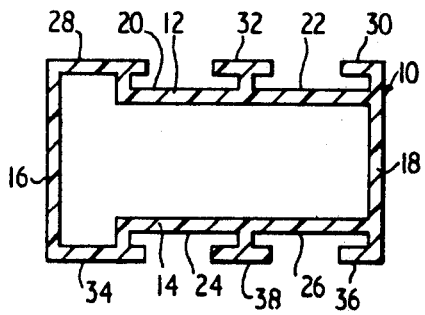
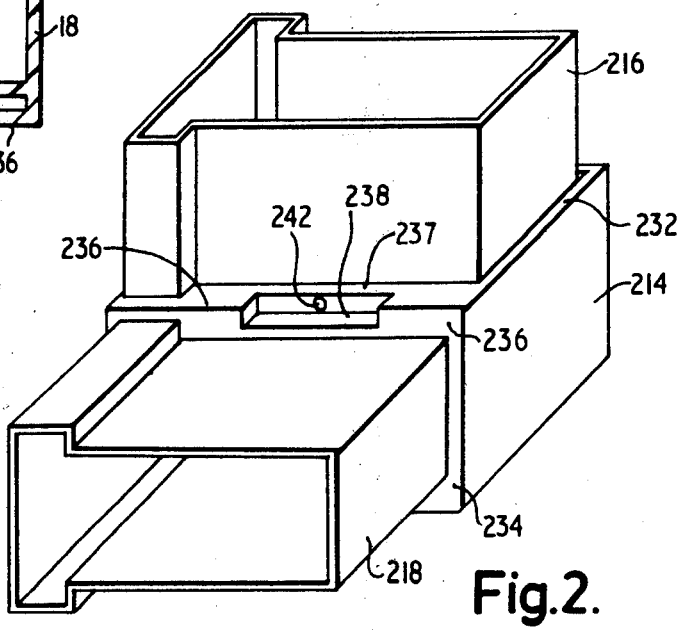
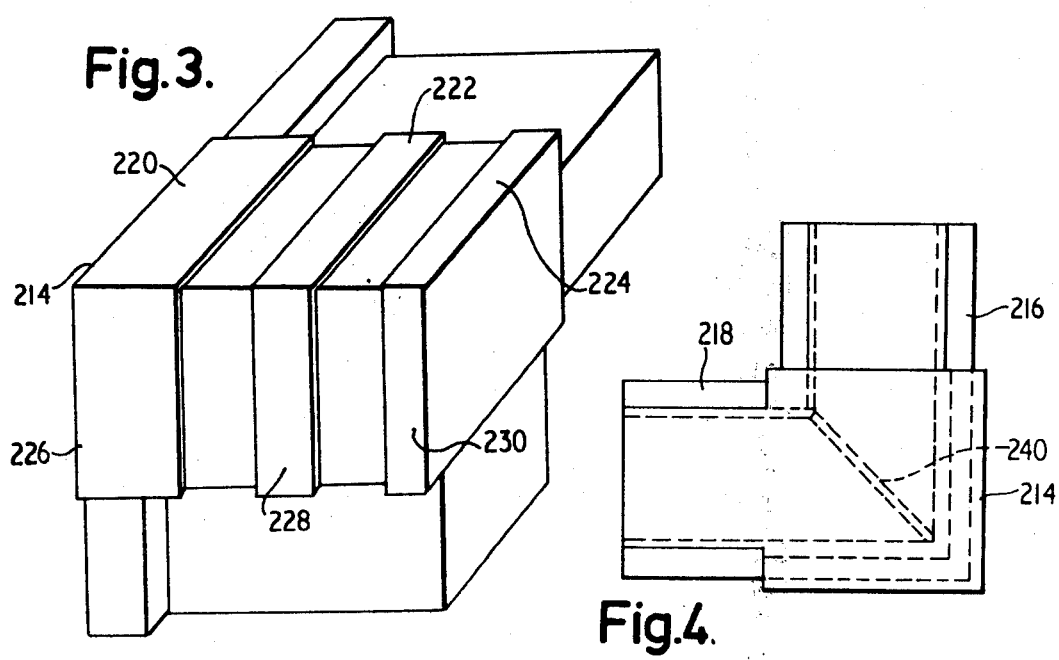

STRUCTURAL ELEMENTS FOR SUB-FRAMES

Metal window frames are often mounted in sub-frames which can be made of timber, although recently some sub-frames have been made from extruded plastics strip-like elements. When a sub-frame is made from such plastics strip-like elements, it is necessary to provide some means of joining the corners of the strip elements, and preferably the corner joint must be of neat appearance as well as fulfilling its function of securing two strip-like elements together at right angles to each other. It is the object of the present invention to provide a corner piece for joining a pair of strip elements in the formation of a sub-frame which is adapted to deal with moisture collected on the sill element of the sub-frame.

According to this invention, a corner piece for joining a pair of strip elements in the formation of a sub-frame as used in building construction, comprises a hollow body adapted for spigot-and-socket connection with a pair of strip elements arranged at right angles to each other, the corner piece being hollow and having a moisture retaining wall arranged so that moisture draining from one of the strip elements into the corner piece, on that side of the moisture retaining wall which includes the spigot-and-socket connection for the upright strip element, is contained therein by the wall. Preferably the moisture retaining wall comprises an internal web substantially dividing one part of the interior of the corner piece from another part. It will be appreciated, that if the corner piece can be arranged to provide a reservoir for moisture from the strip elements of the sub-frame, then it will fulfill a useful function in addition to its primary function of joining together the ends of two strip elements. In some instances, it will be sufficient to leave the moisture in the corner piece, from whence it will evaporate, although it is possible to form a drainage hole through a wall of the corner piece out through which the water can drain, to a position where it will not be detrimental.

Preferably the web is disposed substantially diagonally within the corner piece and it is also preferred that hollow spigots are formed on the corner piece for fitting into corresponding sockets in strip elements.

According to a preferred feature of the invention, the corner piece has a shoulder piece formed in the angle between the two spigots, the shoulder piece having two faces disposed at right angles to each other for abutting respectively with the ends of the strip element received on the spigots of the corner piece, the shoulder piece also having a formation such that it provides a continuation of the bottoms and outer sides of the grooves of two strip elements when they are fitted on to the corner piece. There may be provision for forming a hole through one or both of the inside faces of the shoulder piece which coincides with the grooves in the strip elements and this may take the form of a knock-out formed in one or both of the inside faces of the shoulder piece. Alternatively, a hole may be formed through that part of the or each inside wall of the shoulder piece.

Preferably, the corner piece is formed as a plastics moulding.

Also according to the invention, a structural assembly for use in a building comprises a corner piece in accordance with the invention and a pair of strip elements connected in spigot-and-socket fashion with the corner piece and extending therefrom at right angles to each other. It is further preferred, that each of the strip elements is formed in its inside face with at least one longitudinally extending groove, so disposed that moisture travelling along that groove towards the corner piece is received by the shoulder piece. At least the horizontal strip element may be a sub-frame element. It both the strip elements are sub-frame elements then the external faces of the corner piece are preferably formed with grooves which register with and form continuations of the grooves in the outside faces of the strip elements.

One construction of a corner piece for use in joining a pair of strip elements in the formation of a sub-frame and its method of use in accordance with the invention, will now be described by way of example only, with reference to the accompanying drawings, in which:

FIG. 1 is a transverse cross-section through a sub-frame structural element,

FIG. 2 is a perspective view of a corner piece looking from the inside,

FIG. 3 is a perspective view of the corner piece looking from the outside, and

FIG. 4 is a side elevation of the corner piece.

Referring to FIG. 1, a sub-frame element 10 is made as an extrusion in unplasticised polyvinylchloride (u.p.v.c.) and because of its method of manufacture, this element is of constant cross-section throughout its length. Hence, it is only necessary to illustrate the cross-section in the drawings. Briefly, the element 10 is a hollow rectangle, having a top side wall 12, a bottom side wall 14, and edge walls 16 and 18. T-shaped grooves 20 and 22 are formed in the top side of the element, and similar T-shaped grooves 24 and 26 are formed in the bottom side wall, leaving effective outer "lands" 28 and 30 and an intermediate "land" 32, which together form the top surface of the element 10, and corresponding outer "lands" 34 and 36 and intermediate "land" 38 which together form the bottom face of the element 10. It is to be noted however, that if a sub-frame is made up from four elements such as that illustrated in FIG. 1, then the grooves 20 and 22 will be on the inside of the sub-frame, and the grooves 24 and 26 will be on the outside of the sub-frame.

Now it will be apparent, that it is necessary to make special provision for the jointing of the corner of the elements 10. For this purpose, special corner pieces are provided, one of which is illustrated in FIGS. 2, 3 and 4. This corner piece is made as a u.p.v.c. moulding. As is apparent from the drawings, the corner piece is generally of hollow construction, the thickness of its walls being similar to that of the walls of the sub-frame element 10. Basically, the corner piece comprises a box portion 214, an upright spigot 216 and a horizontal spigot 218. FIG. 3 shows that the two outer sides of the box portion 214 are formed with grooves, which in fact are T-shaped in cross-section, and correspond in their dimensions to the grooves 20, 22, 24 and 26 in the sub-frame element 10. This leaves lands 220, 222 and 224 on one side of the box 214 and similar lands 226, 228 and 230 on the other side of the box member. Moreover, the lands 220, 222 and 224 have the same widths as the lands 28, 32 and 30 on the sub-frame element.

Each of the spigots 216 and 218 is of hollow construction, and has dimensions such that it is a push fit within a sub-frame element 10, and when fitted into the sub-frame element, provides engagement with all the inside faces of that element. Hence, it is possible to slide the lower end of a vertically disposed strip 10, forming a jamb member of the sub-frame on to the upright spigot 216, and to slide one end of a head or sill member made from a horizontally arranged element 10, on to the spigot 218. When the two structural elements have been located on the spigots 216 and 218, with their ends abutting against edges 232 and 234 respectively of the box member 214, a corner joint is formed, and the grooves formed in the outer walls of the box portion 214 then form continuations of the grooves in the outside walls of the sub-frame elements 10. In this manner, the outer appearance of the sub-frame is kept very neat. It will be appreciated, that plastic solvent may be applied to the spigots 216 and 218 before those spigots are pushed into the ends of the sub-frame elements, so that the corner piece becomes solvent welded to the sub-frame elements.

As illustrated in FIG. 2, the corner piece has a shoulder member 236 which forms part of the box 214, but which lies in the angle between the two spigots 216 and 218. A wide gap 238 is formed in the shoulder piece 236, and this gap is so arranged, that when sub-frame elements are fitted on to the corner piece, all four grooves 20 and 22 on both elements communicate with the space formed between the inner ends of the two parts of the shoulder member 236. A filling piece 237 of L-shaped cross-section is formed in the corner of this gap, the thickness of each arm of the filling piece being equal to the thickness of the wall of the element 10. That is to say, the gap is wide enough to register with the inner ends of each of the grooves 20 and 22 in each of the elements 10. When the two sub-frame elements are fitted on to the corner piece, then the inside faces of the filling piece appear, where they are visible, as continuations of the bottoms of the grooves 20 and 22 in the two elements 10.

Now the grooves 20 and 22 in the sub-frame element 10 can act either as moisture traps between the sub-frame and the window frame, or as condensation collecting grooves on the inside of the window frame. In either event, if the moisture collects in a vertical groove in the jamb element, it will run straight down that groove on the filler piece and even in the case of horizontal grooves, in the still element of the sub-frame, if there is a sufficient quantity of moisture in the groove, it will run out at the end onto the filler piece in the inside corner of the corner piece.

As illustrated in FIG. 4, the interior of the hollow box portion 214 of the corner piece is divided by a web 240. Before the corner piece is fitted into the sub-frame elements, a hole (indicated in FIG. 2 at 242) is drilled through the inside wall of the upright spigot 216, offering a communication between the pocket formed by the shoulder member 236, and the interior of the upright spigot 216 on the top side of the web 240. Knock-out pieces may be provided in the inside walls of the spigots 216 and 218, for the purpose of forming the hole 242, but this hole should preferably only be provided in the upright spigot, and for this reason the hole is not preformed in the corner piece.

When the water collects in the pocket as previously described, it will flow through the hole 242 into the interior of the corner piece 214 on the top side of the web 240. The corner piece 214 thereby becomes a collection chamber for moisture, and it may be adequate simply to allow the moisture to evaporate from that chamber. However, if it is anticipated that there will be a considerable quantity of water within the collecting chamber, then it is possible to form a drainage hole in an outside wall of the box portion 214 of the corner piece, which will allow the water to drain out into the outer leaf of the wall in which the sub-frame is fitted, or on to an outside sill, or into a cavity so that in any case, the water is directed away from the inside of the window frame.

It will be appreciated, that the external shape of the box portion 214 of the corner piece is fashioned to suit the external side walls of whatever form of sub-frame element is being used.

I claim:

1. A structural assembly for use in a building comprising a pair of strip elements which form adjacent horizontal and vertical sides of a frame and a corner piece joining said two strip elements together, said corner piece comprising a hollow body, formations at right angles to each other on said hollow body providing respective spigot-and-socket connections with said two strip elements, said body of said corner piece having a moisture retaining wall arranged so that moisture draining from one of said strip elements into said corner piece, on that side of said moisture retaining wall which includes the spigot-and-socket connection for the strip element which provides said vertical side of said frame, is contained therein by said wall.

2. A structural assembly according to claim 1, wherein said moisture retaining wall comprises an internal web substantially dividing one part of the interior of said corner piece from another part.

3. A structural assembly according to claim 1, wherein each of said strip elements is formed in its inside face with at least one longitudinally extending groove, and said corner piece has a shoulder piece formed in the angle between said two spigot-and-socket formations, said shoulder piece having two faces disposed at right angles to each other and abutting respectively with the ends of said strip elements received on said corner piece, said shoulder also having a rebated formation providing a continuation of the bottoms and outer sides of said grooves in said two strip elements.

4. A structural assembly according to claim 3, wherein a hole extends through the part of the wall of said corner piece which is aligned with said at least one groove in said vertical strip element.

5. A corner piece for joining a pair of strip elements in the formation of a sub-frame as used in building construction, comprising a hollow body adapted for spigot-and-socket connection with a pair of strip elements arranged at right angles to each other, the corner piece being hollow and having a moisture retaining wall arranged so that moisture draining from one of said strip elements into said corner piece, on that side of said moisture retaining wall which includes the spigot-and-socket connection for the strip element which provides said vertical side of said frame, is contained therein by said wall.

6. A corner piece according to claim 1, wherein said moisture retaining wall comprises an internal web substantially dividing one part of the interior of said corner piece from another part.

7. A corner piece according to claim 6, wherein said web is disposed substantially diagonally within said corner piece.

8. A corner piece according to claim 1, in which hollow spigots are formed on said corner piece for fitting into corresponding sockets in said strip elements.

9. A corner piece according to claim 8, having a shoulder piece formed in the angle between said two spigots said shoulder piece having two faces disposed at right angles to each other for abutting respectively with the ends of strip elements received on the spigots of said corner piece, said shoulder also having a rebate formation adapted to provide a continuation of the bottoms and outer sides of grooves in two strip elements when they are fitted on to the corner piece.

10. A corner piece according to claim 9, wherein a hole is formed through that part of an inside wall of said corner piece which provides one of the inside faces of the corner piece which coincide with said rebated formation.

* * * * *